United States Patent
Kubo et al.

(10) Patent No.: US 8,306,718 B2
(45) Date of Patent: Nov. 6, 2012

(54) VEHICLE CONTROL APPARATUS

(75) Inventors: Jun Kubo, Hino (JP); Akira Takahashi, Isehara (JP)

(73) Assignee: Hitachi, Ltd., Tokyo (JP)

( * ) Notice: Subject to any disclaimer, the term of this patent is extended or adjusted under 35 U.S.C. 154(b) by 642 days.

(21) Appl. No.: 12/481,929

(22) Filed: Jun. 10, 2009

(65) Prior Publication Data

US 2009/0319148 A1    Dec. 24, 2009

(30) Foreign Application Priority Data

Jun. 19, 2008 (JP) ................. 2008-160240

(51) Int. Cl.
*B60T 7/12* (2006.01)
*B60W 30/16* (2006.01)

(52) U.S. Cl. ........................ 701/96; 701/70

(58) Field of Classification Search ............... None
See application file for complete search history.

(56) References Cited

U.S. PATENT DOCUMENTS

| | | | | |
|---|---|---|---|---|
| 4,146,108 A | * | 3/1979 | Sato | 180/271 |
| 6,056,374 A | * | 5/2000 | Hiwatashi | 303/193 |
| 6,272,416 B1 | * | 8/2001 | Kuroda et al. | 701/70 |
| 2001/0008989 A1 | * | 7/2001 | Minowa et al. | 701/96 |
| 2002/0026276 A1 | * | 2/2002 | Hattori et al. | 701/96 |
| 2003/0085612 A1 | * | 5/2003 | Bond et al. | 303/9 |
| 2005/0187694 A1 | * | 8/2005 | Shiiba et al. | 701/70 |
| 2006/0190158 A1 | * | 8/2006 | Shiiba et al. | 701/70 |
| 2009/0043470 A1 | * | 2/2009 | Ahn | 701/70 |

FOREIGN PATENT DOCUMENTS

| | | |
|---|---|---|
| JP | 6-036187 A | 2/1994 |
| JP | 10-132072 | * 5/1998 |
| JP | 2006-224882 | * 8/2006 |

\* cited by examiner

*Primary Examiner* — Michael J. Zanelli
(74) *Attorney, Agent, or Firm* — Foley & Lardner LLP

(57) ABSTRACT

A vehicle control apparatus includes an accelerator-state detecting section configured to detect an accelerator manipulating state of a driver; a traveling-path-condition detecting section configured to detect a condition of a traveling path of a host vehicle; a brake control section configured to cause the host vehicle to automatically generate a braking force; and a control unit configured to control the brake control section on the basis of an input from the accelerator-state detecting section. The control unit is configured to actuate the brake control section in a case where the accelerator-state detecting section detects a decrease of a manipulated variable of the accelerator or an off-state of the accelerator and also where the traveling-path-condition detecting section detects a target object for speed reduction on the traveling path.

16 Claims, 13 Drawing Sheets

IN THE CASE THAT INTERSECTION POINT (A) IS OBTAINABLE (CURVE RUNNING)

IN THE CASE THAT INTERSECTION POINT (A) IS UNOBTAINABLE (STRAIGHT RUNNING)

VEHICLE CONTROL APPARATUS

BACKGROUND OF THE INVENTION

The present invention relates to a vehicle control apparatus including a brake control section configured to automatically produce braking force.

Japanese Patent Application Publication No. H6-036187 discloses a technique related to an automatic brake. In this technique, a proper turning speed (cornering speed) of a host vehicle at a curve ahead of the host vehicle is calculated based on a map information derived from a navigation system. Moreover, a deceleration required to achieve the proper turning speed is calculated from a current speed of the host vehicle and a distance to the curve. Thereby, the host vehicle is decelerated before the curve if the required deceleration is greater than a predetermined permissible deceleration.

SUMMARY OF THE INVENTION

However, in the above technique, a speed-reduction start timing of the automatic brake is determined based on only a vehicle speed for entry to the curve. Hence, a deviation is caused between the speed-reduction start timing of the automatic brake and a speed-reduction timing desired by a driver. Due to this, there has been a problem that the driver feels uncomfortable.

It is therefore an object of the present invention to provide a vehicle control apparatus devised to achieve a speed-reduction start timing in conformity with a braking intention of the driver.

According to one aspect of the present invention, there is provided a vehicle control apparatus comprising: an accelerator-state detecting section configured to detect an accelerator manipulating state of a driver; a traveling-path-condition detecting section configured to detect a condition of a traveling path of a host vehicle; a brake control section configured to cause the host vehicle to automatically generate a braking force; and a control unit configured to control the brake control section on the basis of an input from the accelerator-state detecting section, the control unit being configured to actuate the brake control section in a case where the accelerator-state detecting section detects a decrease of a manipulated variable of the accelerator or an off-state of the accelerator and also where the traveling-path-condition detecting section detects a target object for speed reduction on the traveling path.

According to another aspect of the present invention, there is provided a vehicle control apparatus comprising: an accelerator-state detecting section configured to detect an accelerator manipulating state of a driver; a speed-reduction target detecting section configured to detect whether a target object for speed reduction is present or absent in a traveling direction of the host vehicle; a brake control section configured to cause the host vehicle to automatically generate a braking force; and a control unit configured to control the brake control section on the basis of an input from the accelerator-state detecting section, the control unit being configured to actuate the brake control section if the speed-reduction target detecting section detects the target object for speed reduction, in a case where the accelerator-state detecting section detects a decrease of a manipulated variable of the accelerator or an off-state of the accelerator, and not to actuate the brake control section if the speed-reduction target detecting section detects no target object for speed reduction, in the case where the accelerator-state detecting section detects the decrease of the manipulated variable of the accelerator or the off-state of the accelerator.

According to still another aspect of the present invention, there is provided a vehicle control apparatus comprising: a curve detecting section configured to detect whether or not a traveling path ahead of a host vehicle is a curve; a brake control section configured to cause the host vehicle to automatically generate a braking force; an intention detecting section configured to detect a driver's intention of accelerating the host vehicle; and a control unit configured to actuate the brake control section before the curve if the curve detecting section detects the curve, the control unit being configured to limit the actuation of the brake control section if the intention detecting section detects the driver's intention of accelerating the host vehicle.

The other objects and features of this invention will become understood from the following description with reference to the accompanying drawings.

DETAILED DESCRIPTION OF THE INVENTION

Figure 1:
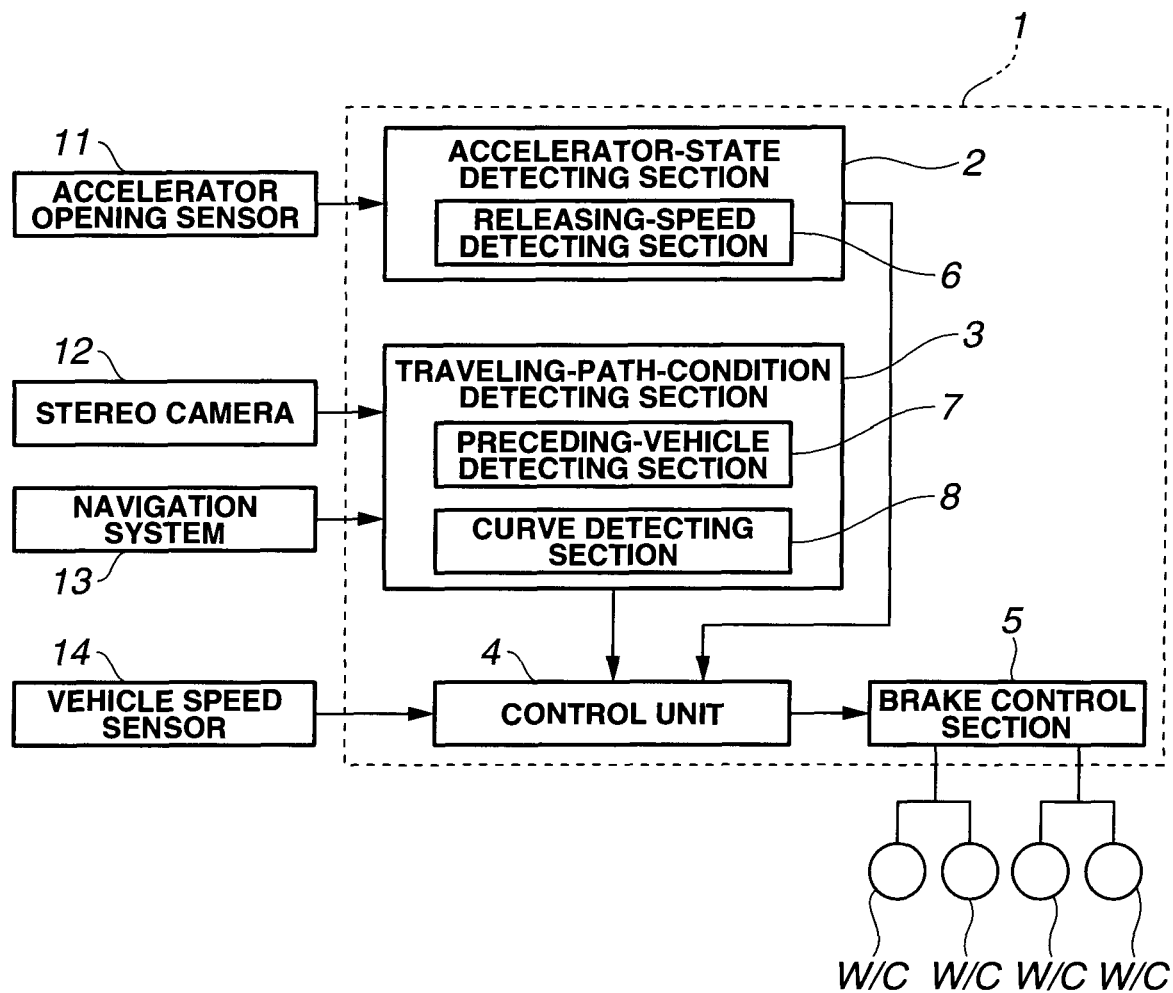
FIG. 1 is a schematic configuration view of a vehicle control apparatus in a first embodiment according to the present invention.

Reference will hereinafter be made to the drawings in order to facilitate a better understanding of the present invention. Embodiments according to the present invention will be explained in detail referring to the drawings.

First Embodiment

At first, a system configuration in a first embodiment according the present invention is now explained. FIG. 1 is a schematic system configuration view of a vehicle control apparatus 1 in the first embodiment. The vehicle control apparatus 1 in the first embodiment includes an accelerator-state detecting section 2, a traveling-path-condition detecting section 3, a control unit 4, and a brake control section 5.

The accelerator-state detecting section 2 detects a manipulating state of accelerator (e.g., on/off of accelerator) according to an intention of driver at the time of running of a host vehicle. The accelerator-state detecting section 2 detects the manipulating state of accelerator on the basis of an accelerator opening which is inputted from an accelerator opening sensor (a speed-up intention detecting section) 11. This accelerator-state detecting section 2 includes an accelerator releasing-speed detecting section 6 functioning to detect a releasing speed of (an easing-up speed on) an accelerator pedal (not shown).

The traveling-path-condition detecting section 3 detects a condition of a traveling path (running course) of the host vehicle, on the basis of a pickup image of a frontward area of the host vehicle which is inputted from a stereo camera 12 and on the basis of a location of the host vehicle and a map information which are obtained from a navigation system 13.

The traveling-path-condition detecting section 3 includes a preceding-vehicle detecting section 7 and a curve detecting section 8. The preceding-vehicle detecting section 7 detects or determines whether or not a preceding vehicle exists on the traveling path of host vehicle ahead of the host vehicle. If the preceding vehicle is present, the preceding-vehicle detecting section 7 detects a running speed of the preceding vehicle (hereinafter referred to as, preceding-vehicle speed) and a distance between the preceding vehicle and the host vehicle (hereinafter referred to as, preceding-vehicle distance). The curve detecting section 8 detects whether or not a curve exists ahead of the host vehicle, namely detects whether or not the traveling path of host vehicle ahead of the host vehicle is a curve. If a curve exists, the curve detecting section 8 detects a turning radius of the curve and a distance between the curve and the host vehicle. That is, the preceding-vehicle detecting section 7 and the curve detecting section 8 function as a speed-reduction target detecting section that detects whether a speed-reduction target object (i.e., the preceding vehicle or curve) requiring a speed reduction of the host vehicle is present or absent in a traveling direction of the host vehicle.

The control unit 4 carries out an automatic brake control for operating the brake control section 5, in accordance with the accelerator manipulating state derived from the accelerator-state detecting section 2 and the traveling path condition derived from the traveling-path-condition detecting section 3. The brake control section 5 increases fluid pressure of each wheel cylinder W/C in accordance with actuation commands (operation signals) derived from the control unit 4, and thereby causes the host vehicle to automatically generate a braking force.

[Process of Automatic Brake Control]

Figure 2:
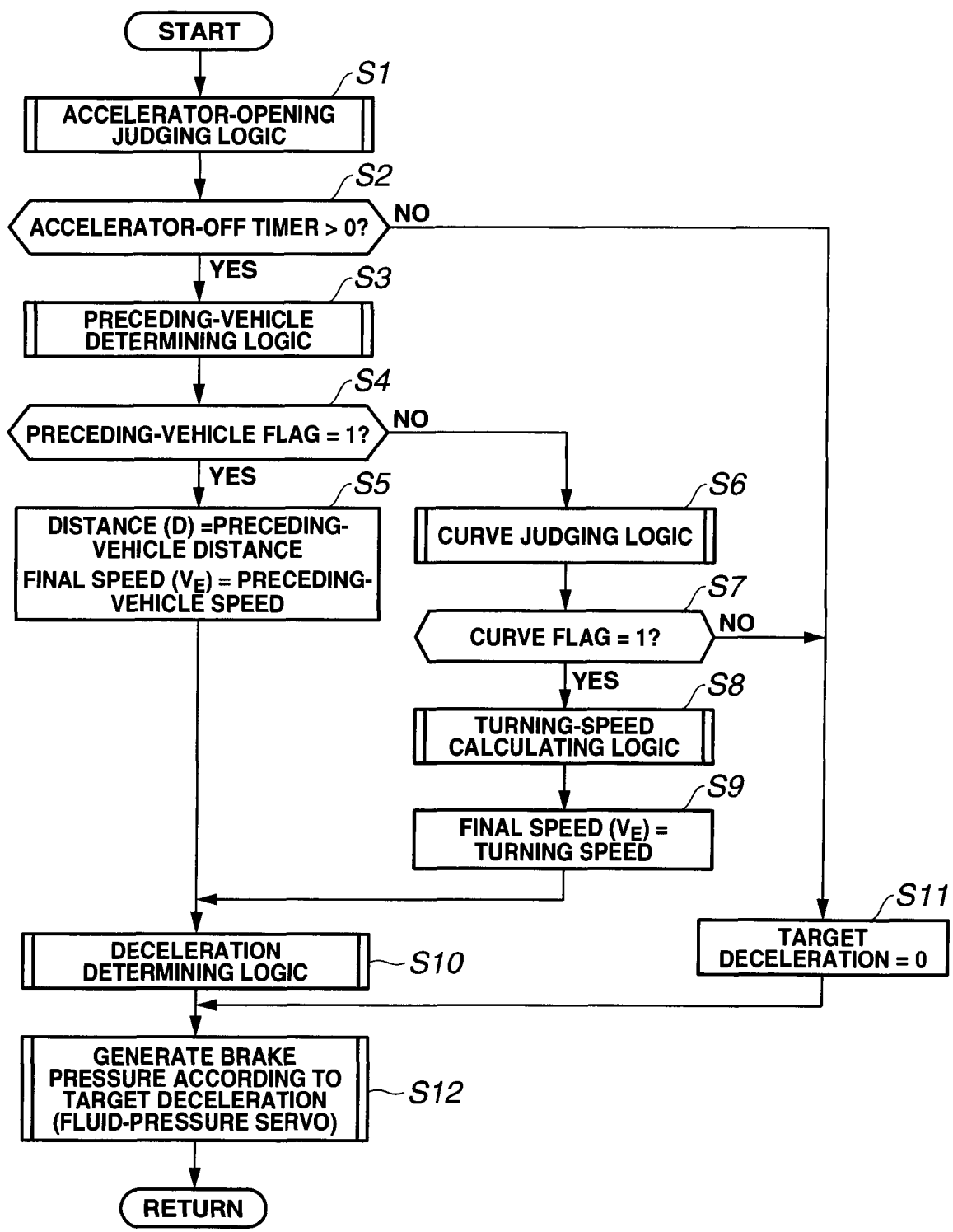
FIG. 2 is a flowchart showing a process flow of an automatic brake control which is executed in the vehicle control apparatus in the first embodiment.

FIG. 2 is a flowchart showing a process flow of the automatic brake control which is executed in the vehicle control apparatus 1 according to the first embodiment. Each step will be explained now.

At step S1, the accelerator-state detecting section 2 carries out an accelerator-opening judging logic for detecting an accelerator-off operation by the driver. Then, the program proceeds to step S2. A result of the accelerator-opening judging logic is outputted as a value of an accelerator-off timer. This accelerator-off timer represents a situation that the driver has done the accelerator-off operation. The value of the accelerator-off timer gradually increases, when a state of accelerator-off is being continued after the driver has done the accelerator-off operation. On the other hand, when the driver is not doing the accelerator-off operation, the value of accelerator-off timer becomes equal to 0. The accelerator-off operation is not limited to a case that the accelerator opening becomes equal to 0 from a certain value, but also includes a case that a decrease of the accelerator opening exceeds a predetermined amount per unit time. Details about the accelerator-opening judging logic will be described below.

At step S2, the accelerator-state detecting section 2 judges whether or not the value of accelerator-off timer is any value except 0 (i.e., the value of accelerator-off timer>0). If YES at step S2, the program proceeds to step S3. If NO at step S2, the program proceeds to step S11.

At step S3, the preceding-vehicle detecting section 7 carries out a preceding-vehicle determining logic for detecting the preceding vehicle existing ahead of the host vehicle. Then, the program proceeds to step S4. A result of the preceding-vehicle determination is outputted as a preceding-vehicle flag. If the preceding vehicle is detected or recognized, the preceding-vehicle flag is set at 1 (=1). If the preceding vehicle is not detected or recognized, the preceding-vehicle flag is reset at 0 (=0). Moreover, in the case that the preceding vehicle is detected, the preceding-vehicle speed and the preceding-vehicle distance are respectively calculated in the preceding-vehicle determining logic. It is noted that a nearest vehicle is determined as the preceding vehicle if a plurality of vehicles exist ahead of the host vehicle. Details about the preceding-vehicle determining logic will be described below.

At step S4, the preceding-vehicle detecting section 7 judges whether or not the preceding-vehicle flag has been set, namely, whether or not the preceding-vehicle flag is equal to 1. If YES at step S4, the program proceeds to step S5. If NO at step S4, the program proceeds to step S6.

At step S5, the preceding-vehicle detecting section 7 defines the value of the preceding-vehicle distance as a distance D, namely, assigns the value of the preceding-vehicle distance to the distance D. Similarly, the preceding-vehicle detecting section 7 defines the value of the preceding-vehicle speed as a final speed $V_E$, namely, assigns the value of the preceding-vehicle speed to the final speed $V_E$. Then, the program proceeds to step S6.

At step S6, the curve detecting section 8 carries out a curve judging logic for detecting whether or not the traveling path in the frontward area of the host vehicle is a curve (curved path). Then, the program proceeds to step S7. A result of the curve judging logic is outputted as a curve flag. If the curve exists, the curve flag is set at 1 (=1). If the curve does not exist, the curve flag is reset at 0 (=0). Moreover, in the case that the curve is detected, the turning radius R of the curve and the distance between the curve and the host vehicle are respectively calculated in the curve judging logic. The curve detecting section 8 defines the value of the distance between the curve and the host vehicle as the distance D, namely, assigns the value of the distance between the curve and the host vehicle to the distance D. Details about the curve judging logic will be described below.

At step S7, the curve detecting section 8 judges whether or not the curve flag has been set, namely, whether or not the curve flag is equal to 1. If YES at step S7, the program proceeds to step S8. If NO at step S7, the program proceeds to step S11.

At step S8, the curve detecting section 8 carries out a turning-speed calculating logic for calculating a target turning speed (possible or feasible cornering speed) based on a condition of the curve and a set target turning acceleration (hereinafter referred to as, turning acceleration G). Then, the program proceeds to step S9. Details about the turning-speed calculating logic will be described below.

At step S9, the curve detecting section 8 defines the value of the target turning speed calculated at step S8 as the final speed $V_E$ (target curve-entry speed), namely, assigns the value of the target turning speed to the final speed $V_E$. Then, the program proceeds to step S10.

At step S10, the control unit 4 carries out a deceleration determining logic for determining a target deceleration α. The target deceleration α is a value (a speed-reducing rate) necessary to achieve the final speed $V_E$ by using the distance D (after running the distance D). Then, the program proceeds to step S11. Details about the deceleration determining logic will be described below.

At step S11, the control unit 4 sets the target deceleration α at 0, and the program proceeds to step S12.

At step S12, the control unit 4 outputs actuation commands according to the target deceleration α determined at step S10 or step S11, to the brake control section 5. The brake control section 5 adjusts fluid pressure of each wheel cylinder W/C by way of servo control, so as to generate a brake pressure corresponding to the actuation command. Then, the program returns.

[Accelerator-Opening Judging Logic]

Figure 3:
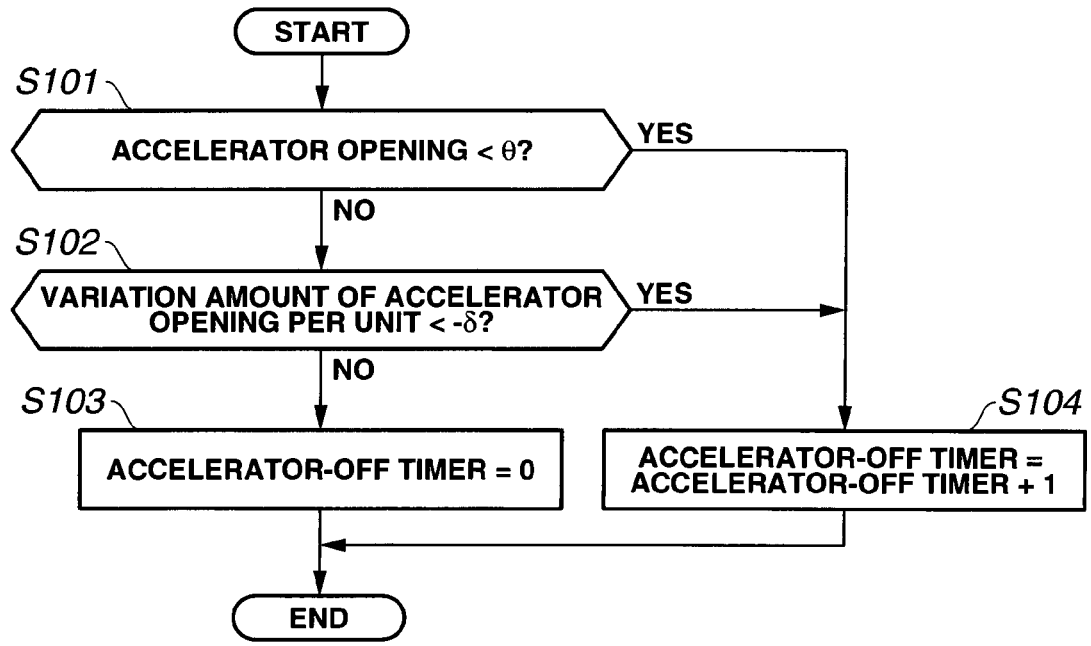
FIG. 3 is a flowchart showing a flow of an accelerator-opening judging logic.

FIG. 3 is a flowchart showing a flow of the accelerator-opening judging logic. Each step will be explained now.

At step S101, it is judged whether or not the accelerator opening inputted from the accelerator opening sensor 11 is smaller than a predetermined value θ. If YES at step S101, the program proceeds to step S104. If NO at step S101, the program proceeds to step S102. The predetermined value θ is a minute accelerator-opening value, near 0.

At step S102, it is judged whether or not a variation amount (degree of variation) of the accelerator opening per unit time is smaller than the predetermined amount −δ. If YES at step S102, the program proceeds to step S104. If NO at step S102, the program proceeds to step S103. The predetermined amount −δ is a variation amount of the accelerator opening, below which it can be determined that the driver is intentionally decreasing the accelerator opening. The unit time is, for example, given by one control period of the automatic brake control process shown in FIG. 2.

At step S103, the accelerator-off timer is set at 0, and a routine of the accelerator-opening judging logic is ended.

At step S104, the accelerator-off timer is incremented by one (+1), namely, the value of accelerator-off timer is added to 1. Then, the routine of the accelerator-opening judging logic is ended.

Figure 4:
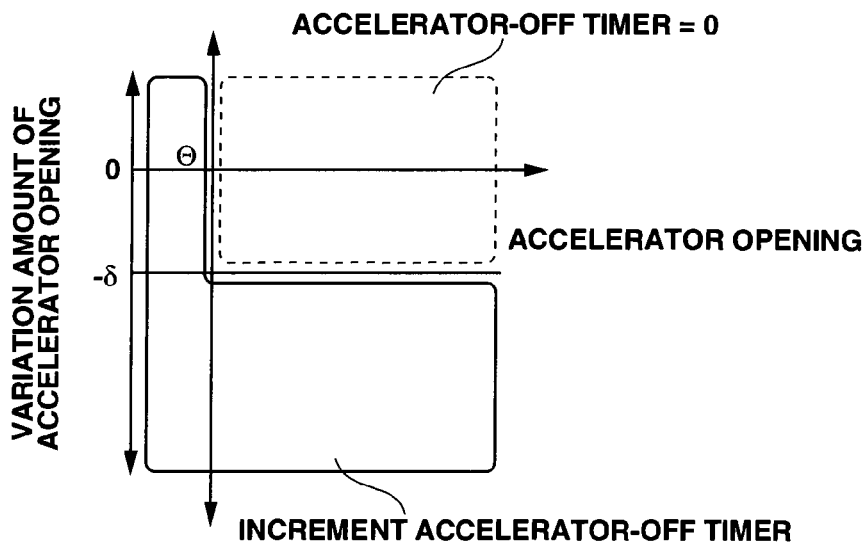
FIG. 4 is a view showing a relation of an accelerator-off timer with an accelerator opening and a variation amount of accelerator opening in the accelerator-opening judging logic.

As mentioned above, in the accelerator-opening judging logic, it is determined that there is the accelerator-off operation of driver when the accelerator opening is equal to 0 (accelerator opening<θ) or when the decreased amount of the accelerator opening (decreased amount of accelerator manipulated variable) per unit time is greater (in absolute value) than the predetermined amount δ. In this case, the accelerator-off timer is incremented. This case where the presence of the accelerator-off operation of driver is determined is shown by a region surrounded by a solid line in FIG. 4. In the other cases, namely in a region surrounded by a broken line in FIG. 4, the accelerator-off timer is set at 0.

Figure 5:
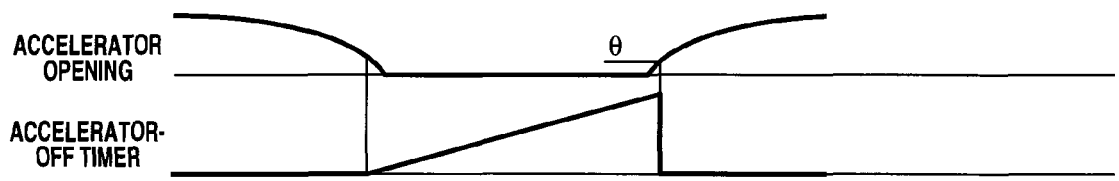
FIG. 5 is a time chart showing a variation of the accelerator-off timer in the case that the accelerator is released and then depressed again.

For example as shown in FIG. 5, if the driver eases up on the accelerator to release the accelerator and then again depresses the accelerator, the accelerator-off timer continues to increase from a time point when the variation amount of the accelerator opening per unit time becomes smaller than the predetermined amount −δ until a time point when the accelerator opening becomes greater than or equal to the predetermined value θ.

[Preceding-Vehicle Determining Logic]

Figure 6:
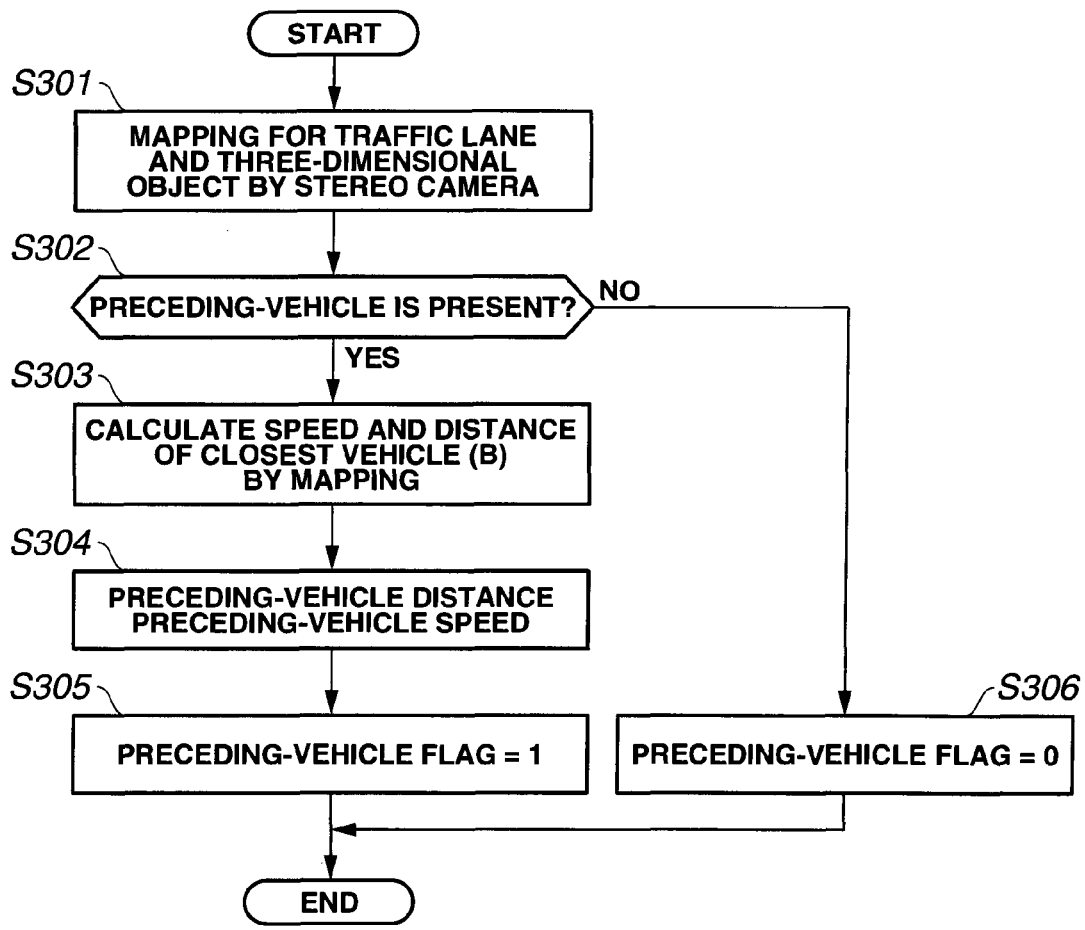
FIG. 6 is a flowchart showing a flow of a preceding-vehicle determining logic.

FIG. 6 is a flowchart showing a flow of the preceding-vehicle determining logic. Each step will be explained now.

Figure 7:
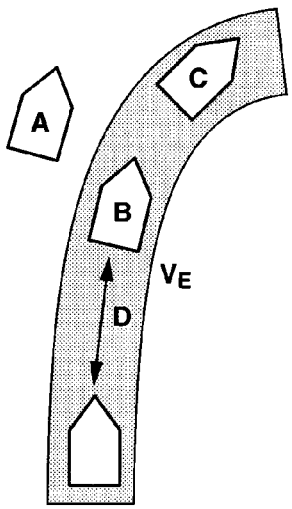
FIG. 7 is a view showing a setting method of a preceding-vehicle distance and a preceding-vehicle speed in the preceding-vehicle determining logic.

At step S301, a two-dimensional plane mapping for three-dimensional objects and a traffic lane (such as white lines) ahead of the host vehicle is performed based on the frontward-area image taken by the stereo camera 12 as shown in FIG. 7. Then, the program proceeds to step S302. It is noted that a method of this mapping can employ a commonly-known method, and therefore explanations thereof will be omitted for the purpose of simplification of the disclosure.

At step S302, it is judged whether the preceding-vehicle is present or absent on the basis of the projection plane view produced by the mapping. If YES at step S302, the program proceeds to step S303. If NO at step S302, the program proceeds to step S306.

At step S303, speed and inter-vehicular distance of a vehicle (B in FIG. 7) which is closest to the host vehicle among a plurality of vehicles (B and C in FIG. 7) existing in the lane are calculated. Then, the program proceeds to step S304.

At step S304, the distance and the speed calculated at step S303 are regarded as the preceding-vehicle distance and the preceding-vehicle speed. Then, the program proceeds to step S305.

At step S305, the preceding-vehicle flag is set at 1, and a routine of the preceding-vehicle determining logic is ended. At step S306, the preceding-vehicle flag is reset at 0, and the routine of the preceding-vehicle determining logic is ended.

As mentioned above, in the preceding-vehicle determining logic, it is judged whether or not any preceding vehicle exists on the traveling path of the host vehicle by using the image picked up by the stereo camera 12. If the preceding vehicle exists, the preceding-vehicle flag is set at 1. If no preceding vehicle exists, the preceding-vehicle flag is reset. Moreover, in the case that the preceding vehicle exists, the preceding-vehicle distance and preceding-vehicle speed are calculated.

[Curve Judging Logic]

Figure 8:
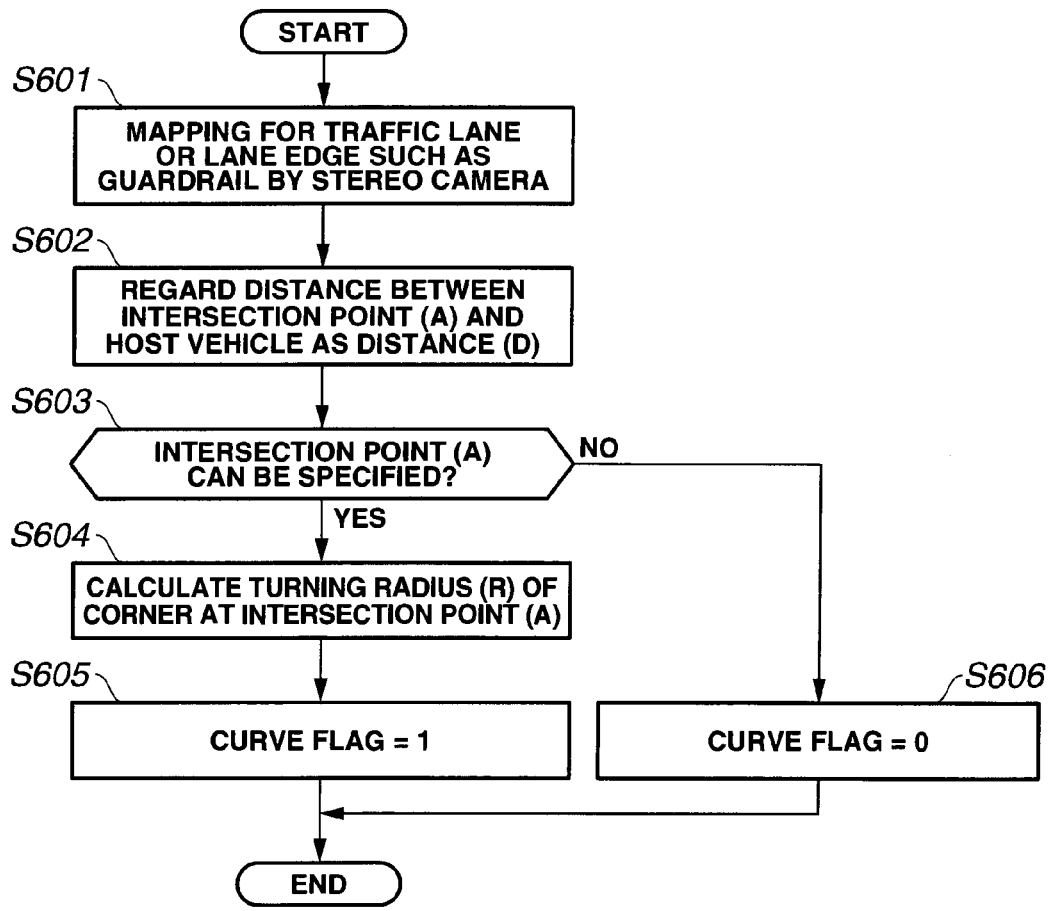
FIG. 8 is a flowchart showing a flow of a curve judging logic.

FIG. 8 is a flowchart showing a flow of the curve judging logic. Each step will be explained now.

At step S601, a two-dimensional plane mapping for a traffic lane or lane-edge objects such as guardrails is performed based on the frontward-area image taken by the stereo camera 12. Then, the program proceeds to step S602.

Figure 9:
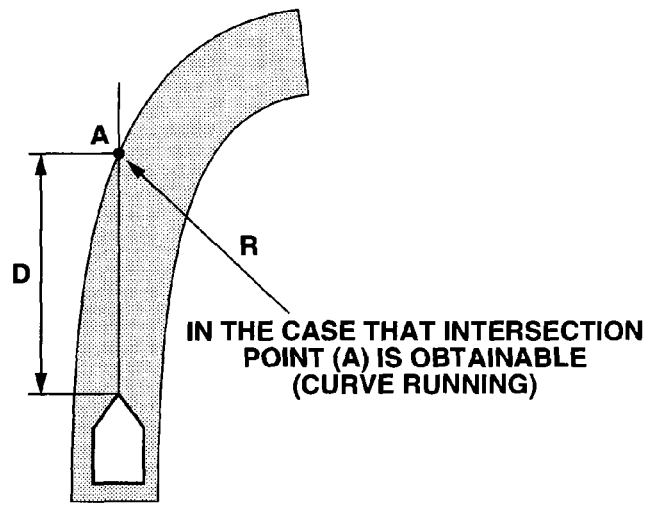
FIG. 9 is a view showing a setting method of a distance and a final speed in the curve judging logic, during a curve running.

At step S602, an intersection point A between an edge line (left or right boundary) of the lane and a running-directional center line of the host vehicle (a center line of vehicle body in traveling direction) is determined based on the projection plan view produced by the mapping at step S601, as shown in FIG. 9. Thereby, a distance between the intersection point A and the host vehicle is calculated and regarded as the distance D. Then, the program proceeds to step S603. It is noted that the distance D is not changed (i.e., is maintained at a fixed value) until the host vehicle reaches the intersection point A. That is, when the host vehicle has reached the initially-determined intersection point A, a new intersection point A is determined, and the distance D is set at a new value calculated based on the new intersection point A.

At step S603, it is judged whether or not the intersection point A has been specified, namely, whether or not the intersection point A can be determined from the projection plan view. If YES at step S603, the program proceeds to step S604. If NO at step S603, the program proceeds to step S606.

At step S604, the turning radius R of the corner (curve) at the intersection point A is calculated based on the map information near the intersection point A and the location information of the host vehicle which are obtained from the navigation system 13. Then, the program proceeds to step S605.

At step S605, the curve flag is set at 1, and a routine of the curve judging logic is ended. At step S606, the curve flag is reset at 0, and the routine of the curve judging logic is ended.

Figure 10:
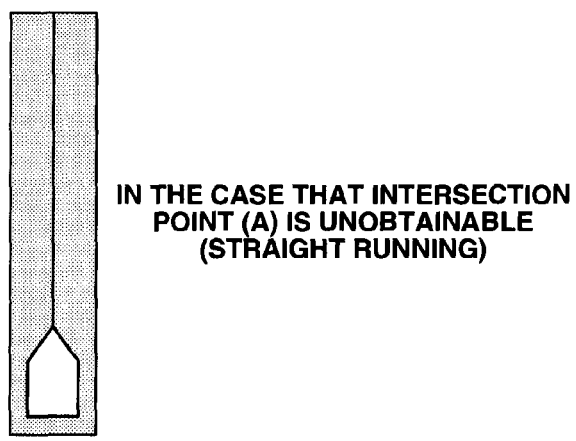
FIG. 10 is a view showing a state where a host vehicle travels on a straight path.

As mentioned above, in the curve judging logic, in the case that the intersection point A between the lane edge and the running-directional center line of host vehicle can be specified as shown in FIG. 9; it is determined that a curve requiring some speed-reduction of host vehicle exists ahead of the host vehicle, so that the curve flag is set at 1. On the other hand, in the case that the intersection point A cannot be specified as shown in FIG. 10; it is determined that a curve requiring some speed-reduction of host vehicle does not exist ahead of the host vehicle, so that the curve flag is reset at 0. Moreover, in the case that the curve exists, the distance D up to the intersection point A and the turning radius R at the intersection point A are calculated.

[Turning-speed Calculating Logic]

Figure 11:
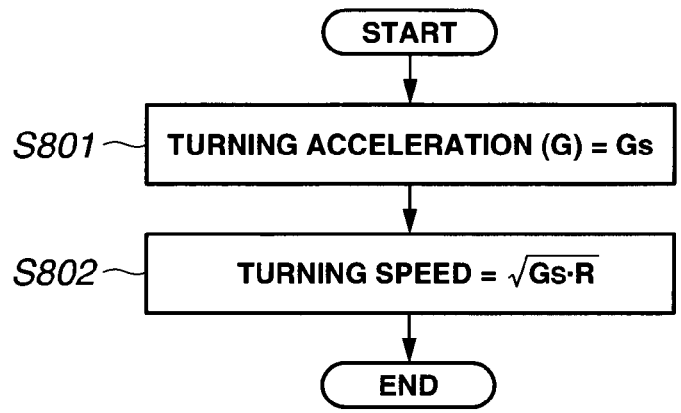
FIG. 11 is a flowchart showing a flow of a turning-speed calculating logic.

FIG. 11 is a flowchart showing a flow of the turning-speed calculating logic. Each step will be explained now.

At step S801, a target turning acceleration Gs at the intersection point A is regarded as the turning acceleration G, namely, the target turning acceleration Gs is assigned to the turning acceleration G. Then, the program proceeds to step S802. This target turning acceleration Gs may be a predetermined value (for example, approximately 0.2 G), or may be any value set by the driver on a driver seat. Alternatively, the target turning acceleration Gs may be set as a function of the releasing speed (easing-up speed) of the accelerator.

At step S802, the target turning speed is calculated based on a following formula (1) from the turning acceleration G and the turning radius R of the intersection point A. Then, a routine of the turning-speed calculating logic is ended.

$$\text{Turning Speed} = \sqrt{Gs \cdot R} \quad (1)$$

As mentioned above, in the turning-speed calculating logic, the target turning speed at the intersection point A is calculated based on the target turning acceleration Gs and the turning radius R of the intersection point A.

[Deceleration Determining Logic]

Figure 12:
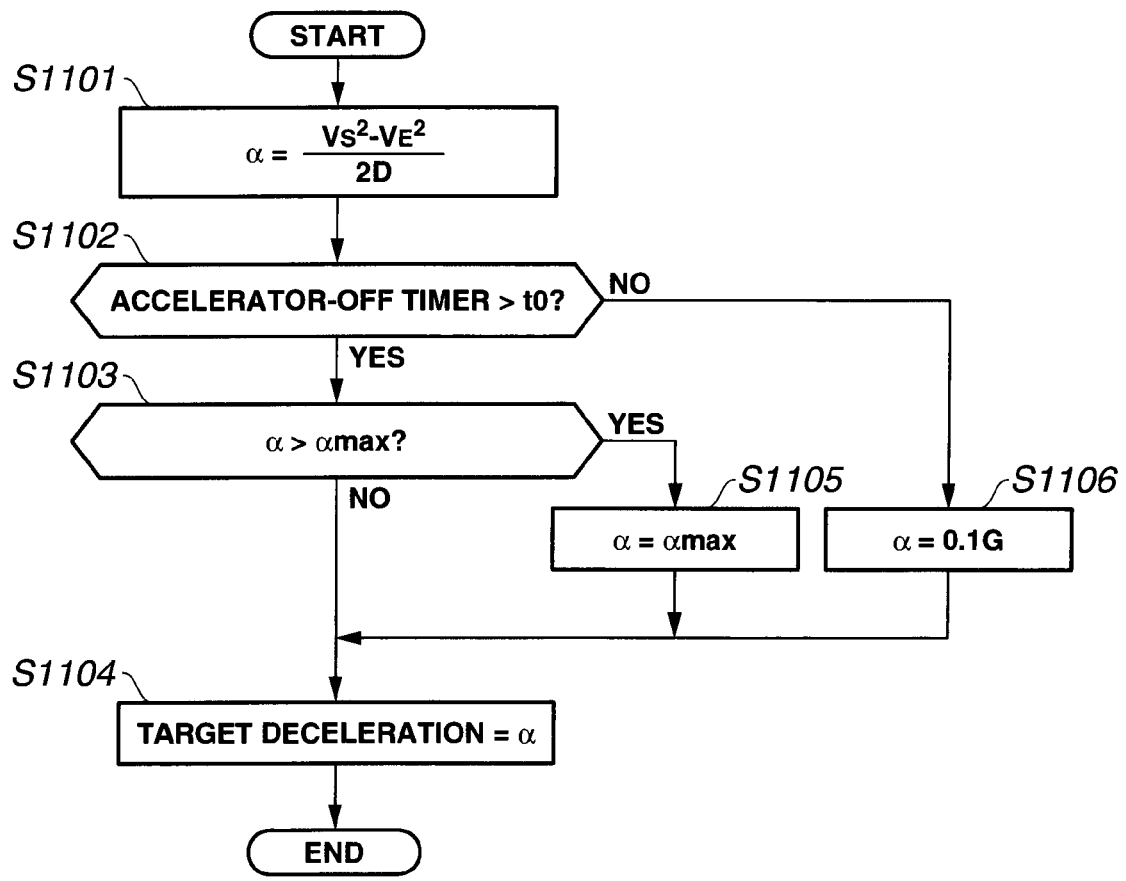
FIG. 12 is a flowchart showing a flow of a deceleration determining logic.

FIG. 12 is a flowchart showing a flow of the deceleration determining logic. Each step will be explained now.

At step S1101, a current vehicle speed (speed at this moment) Vs is read out from a vehicle speed sensor 14, and then the target deceleration α (<0) necessary to reduce the speed of host vehicle from the initial speed (current speed value) Vs to the final speed $V_E$ within the distance D is calculated. Then, the program proceeds to step S1102. That is, since a relation: $Vs^2 - V_E^2 = 2\alpha D$ is satisfied, the target deceleration α can be calculated from a following formula (2).

$$\alpha = (Vs^2 - V_E^2)/2D \quad (2)$$

At step S1102, it is judged whether or not (the value of) the accelerator-off timer is greater than a predetermined time interval t0. If YES at step S1102, the program proceeds to step S1103. If NO at step S1102, the program proceeds to step S1106. The predetermined time interval t0 is varied according to the accelerator releasing speed (accelerator-opening decreasing speed) detected by the accelerator releasing-speed detecting section 6. More specifically, in the case that the accelerator releasing speed is high, the predetermined time interval t0 is set at a greater value than that in the case that the accelerator releasing speed is low. That is, the predetermined time interval t0 in the case of high accelerator releasing speed is elongated as compared with the case of low accelerator releasing speed. It is noted that the predetermined time interval t0 may be provided to have a plurality of step values according to the accelerator releasing speed, or may be provided to become greater as the accelerator releasing speed becomes higher.

At step S1103, it is judged whether or not a magnitude (absolute value) of the target deceleration α is greater than a limiter αmax. If YES at step S1103, the program proceeds to step S1105. If NO at step S1103, the program proceeds to step S1104. The limiter αmax is an upper limit value for avoiding an occurrence of rapid slowdown (abrupt deceleration).

At step S1104, the value α calculated at step S1101, S1105 or S1106 is regarded as the target deceleration. Then, a routine of the deceleration determining logic is ended.

At step S1105, the limiter αmax is assigned to the value α, and the program proceeds to step S1104. At step S1106, a predetermined value 0.1 G is assigned to the value α, and the program proceeds to step S1104.

Figure 13:
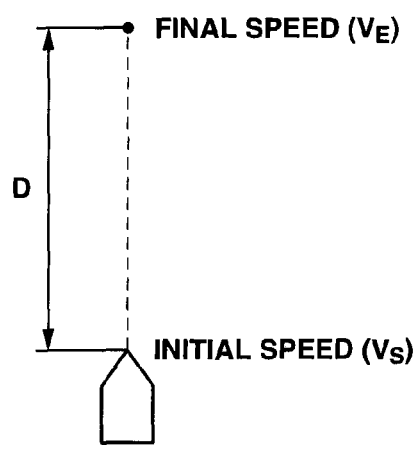
FIG. 13 is a view showing a setting method of a target deceleration in the deceleration determining logic.

As mentioned above, in the deceleration determining logic, the target deceleration α is maintained at 0.1 G from a time point when the accelerator-off operation is started until a time point when the value of the accelerator-off timer reaches the predetermined time interval t0. When the predetermined time interval t0 has elapsed, the target deceleration α is determined which is necessary to cause the initial speed Vs of the host vehicle to fall to the final speed $V_E$ by using the distance D between the host vehicle and the preceding vehicle or the curve, as shown in FIG. 13. At this time, in order to avoid an occurrence of rapid slowdown due to an excessive setting of magnitude |α| of the target deceleration α, the target deceleration α is limited by the limiter αmax. Moreover, in the case that the accelerator releasing speed is relatively high, the predetermined time interval t0 is made longer than that in the case that the accelerator releasing speed is low.

Figure 14:
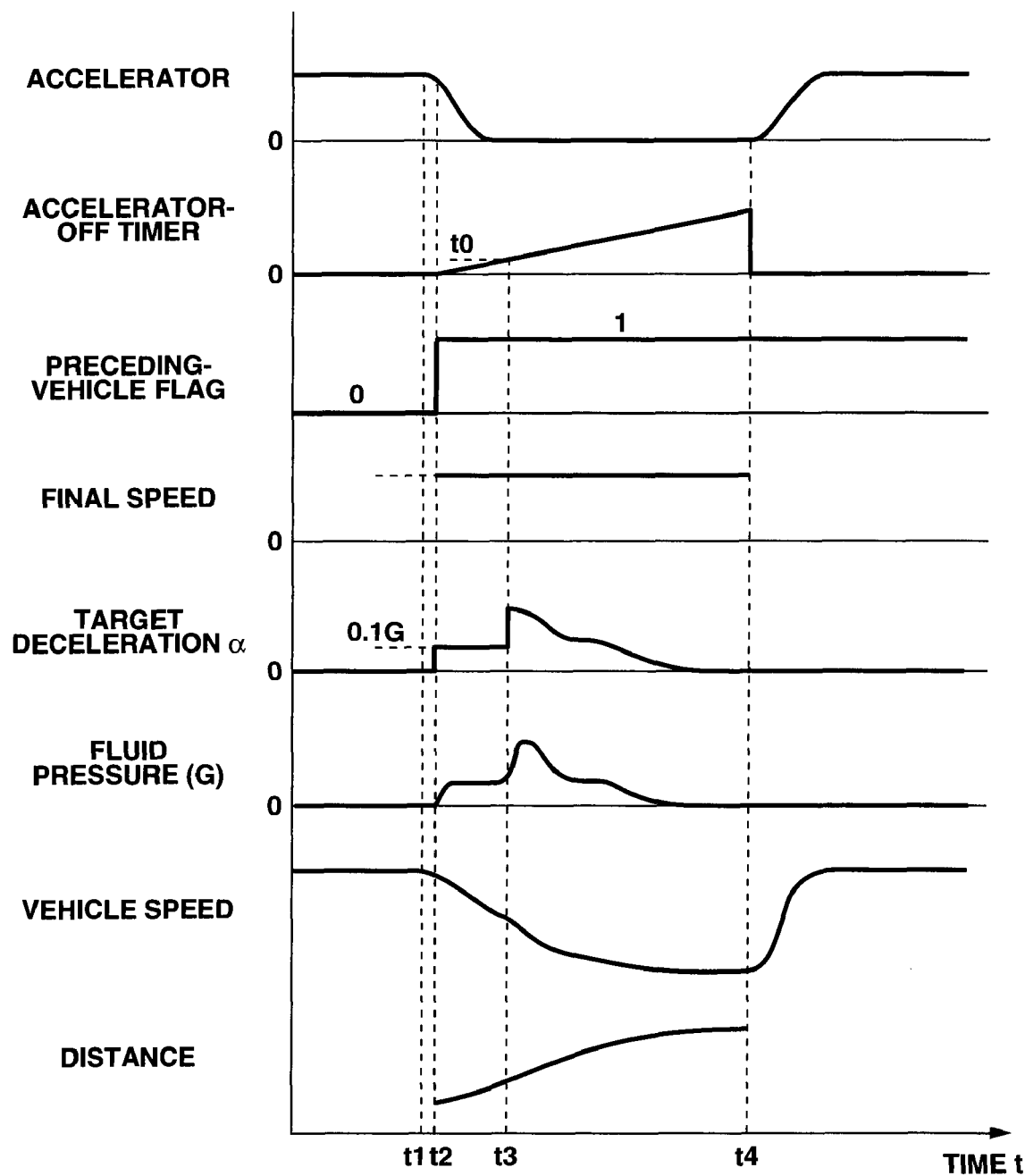
FIG. 14 is a time chart showing a variation of the target deceleration in the case that the host vehicle travels on a curve and also a preceding vehicle is present.

Next, operational flows of the vehicle control apparatus 1 in the first embodiment are now explained with respect to several traveling scenes. FIG. 14 is a time chart showing a variation of the target deceleration in the case that the host vehicle travels on a curve and also a preceding vehicle is present. The target deceleration α takes negative values if the frontward direction of the host vehicle is defined as a positive direction (i.e., if viewed from a meaning of "acceleration"). However, in the following several time charts, the target deceleration α is shown in magnitude (in absolute value).

Since the accelerator opening is constant (>θ) until a time point t1, the program proceeds as step S1→step S2→step S11→step S12 in the flowchart of FIG. 2. Until the time point t1, the target deceleration α is equal to 0. That is, even in the case where the host vehicle is traveling on a curve and also a preceding vehicle is present, the automatic brake is not activated (i.e., not applied) if the accelerator-off operation of the driver does not occur. Thus, the driver does not feel uncomfortable, because the decrease of speed of the host vehicle is not carried out when the driver has no intention of speed reduction. At the time point t1, the driver starts to release the accelerator.

At a time point t2, the variation amount of the accelerator opening per unit time becomes smaller than the predetermined amount $-\delta$. Hence, the accelerator-off operation is detected so that the program proceeds as step S1→step S2→step S3→step S4→step S5→step S10→step S12 in the flowchart of FIG. 2.

At this time, the accelerator-off timer starts to be incremented in the accelerator-opening judging logic of step S1, the preceding-vehicle flag (=1) is outputted in the preceding-vehicle determining logic of step S3, and the target deceleration α necessary to reduce the initial speed (host vehicle speed Vs) to the preceding-vehicle speed (final speed) $V_E$ within the preceding-vehicle distance D is calculated in the deceleration determining logic of step S10. However, in the deceleration determining logic of step S10, the target deceleration α is set at the predetermined value (=0.1 G) because the value of accelerator-off timer is smaller than or equal to the predetermined time interval t0. Thereby, the automatic brake is activated to moderately decrease the speed of the host vehicle.

A time interval between the time point t2 and a time point t3 varies in correspondence with the predetermined time interval t0 determined according to the accelerator releasing speed. The predetermined time interval t0 in the case where the accelerator releasing speed is high is made longer than that in the case where the accelerator releasing speed is low. That is, if the driver conducts the accelerator-off operation immediately before the curve, the target deceleration is maintained at 0.1 G for a relatively long time, resulting in a high turning speed. On the contrary, if the driver conducts the accelerator-off operation well before the curve, the target deceleration is maintained at 0.1 G for a relatively short time, resulting in a low turning speed. Therefore, the turning speed can be made high if the driver desires a high-speed turning, and on the other hand, the turning speed can be made low if the driver desires a low-speed turning. Accordingly, a turn behavior desired by the driver can be attained.

At the time point t3, the value of accelerator-off timer exceeds the predetermined time interval t0. Hence, the automatic brake is actuated according to the target deceleration α calculated from the distance D, the initial speed Vs and the final speed $V_E$ in the deceleration determining logic of step S10. Therefore, the host vehicle can run on (and pass through) the curve while maintaining a proper distance between the preceding vehicle and the host vehicle.

At a time point t4, the driver starts to depress the accelerator. Hence, the accelerator-off timer is set at 0 in the accelerator-opening judging logic of step S1. Thereby, the program proceeds as step S1→step S2→step S11→step S12 in the flowchart of FIG. 2, so that the actuation of the automatic brake is terminated. Thus, the driver does not receive an uncomfortable feeling because the decrease of speed is not conducted if the driver has an intention of accelerating the host vehicle.

Figure 15:
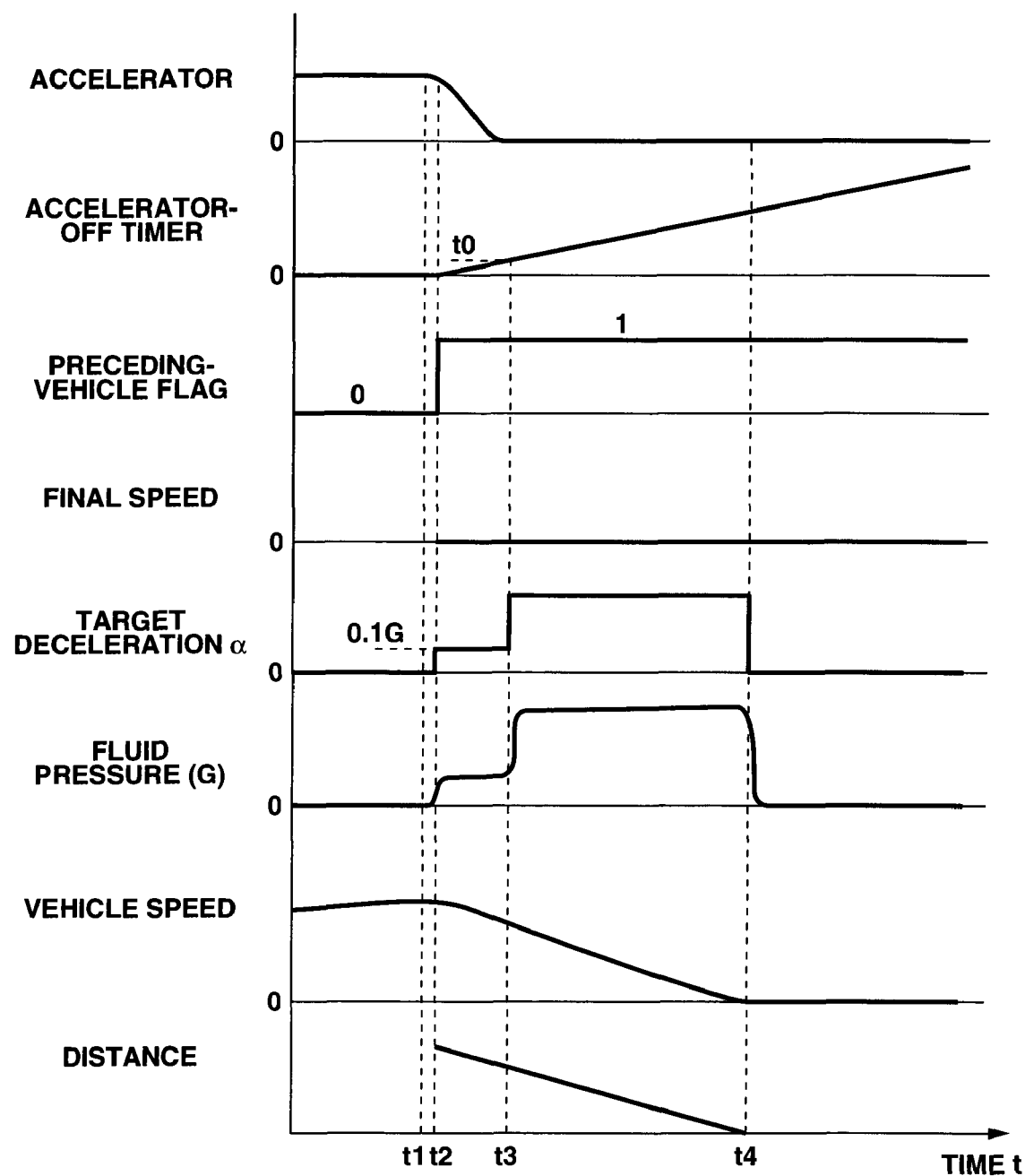
FIG. 15 is a time chart showing a variation of the target deceleration in the case that the host vehicle travels on a curve and also a preceding vehicle is present in a stopped state.

FIG. 15 is a time chart showing a variation of the target deceleration in the case that the host vehicle travels on a curve and also a preceding vehicle is present in a stopped state.

Since the accelerator opening is constant (>θ) until the time point t1, the program proceeds as step S1→step S2→step S11→step S12 in the flowchart of FIG. 2. Until the time point t1, the target deceleration α is equal to 0. That is, even in the case where the host vehicle is traveling on a curve and also a preceding vehicle (a stopped vehicle) is present, the automatic brake is not activated (i.e., not applied) if the accelerator-off operation of the driver does not occur. Thus, the driver does not feel uncomfortable, because the reduction of speed is not carried out if the driver has no intention of speed reduction. At the time point t1, the driver starts to release the accelerator.

At time point t2, the variation amount of the accelerator opening per unit time becomes smaller than the predetermined amount $-\delta$. Hence, it is determined that the accelerator-off operation has occurred so that the program proceeds as step S1→step S2→step S3→step S4→step S5→step S10→step S12 in the flowchart of FIG. 2.

At this time, the accelerator-off timer starts to be incremented in the accelerator-opening judging logic of step S1, the preceding-vehicle flag (=1) is outputted in the preceding-vehicle determining logic of step S3, and the target deceleration α necessary to reduce the initial speed (host vehicle speed Vs) to the final speed (preceding-vehicle speed=0) within the preceding-vehicle distance D is calculated in the deceleration determining logic of step S10. However, in the deceleration determining logic of step S10, the target deceleration α is set at the predetermined value (=0.1 G) because the value of accelerator-off timer is smaller than or equal to the predetermined time interval t0. Thereby, the automatic brake is activated to moderately decrease the speed of host vehicle.

A time interval between time point t2 and time point t3 varies in correspondence with the predetermined time interval t0 determined according to the accelerator releasing speed. The predetermined time interval t0 in the case where the accelerator releasing speed is high is made longer than that in the case where the accelerator releasing speed is low. That is, if the driver conducts the accelerator-off operation immediately before the curve, the target deceleration is maintained at 0.1 G for a relatively long time, resulting in a high turning speed. On the contrary, if the driver conducts the accelerator-off operation well before the curve, the target deceleration is maintained at 0.1 G for a relatively short time, resulting in a low turning speed. Therefore, the turning speed can be made high if the driver desires to turn at a high speed, and on the other hand, the turning speed can be made low if the driver desires to turn at a low speed. Accordingly, the turn behavior desired by the driver can be attained.

At time point t3, the value of accelerator-off timer exceeds the predetermined time interval t0. Hence, the automatic brake is actuated according to the target deceleration α calculated from the distance D, the initial speed Vs and the final speed (=0) in the deceleration determining logic of step S10. Therefore, the host vehicle can be stopped just before the preceding vehicle at time point t4.

Figure 16:
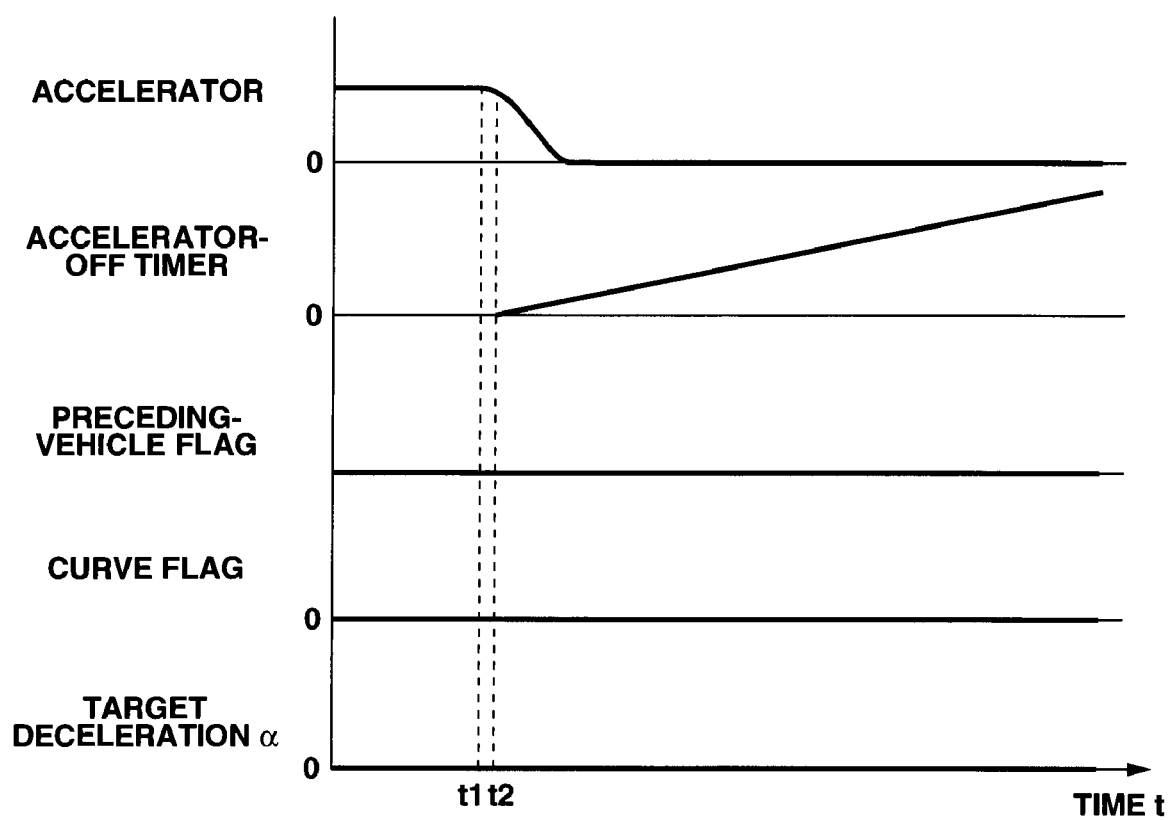
FIG. 16 is a time chart showing a variation of the target deceleration in the case that the host vehicle travels on a straight path and also a preceding vehicle is absent.

FIG. 16 is a time chart showing a variation of the target deceleration in the case that the host vehicle travels on a straight path (straight running) and also a preceding vehicle is absent.

Since the accelerator opening is constant (>θ) until time point t1, the program proceeds as step S1→step S2→step S11→step S12 in the flowchart of FIG. 2. Until the time point t1, the target deceleration α is equal to 0. At time point t1, the driver starts to release the accelerator.

At time point t2, the variation amount of the accelerator opening per unit time becomes smaller than the predetermined amount $-\delta$. Hence, it is determined that the accelerator-off operation has occurred. However, since there is neither preceding vehicle nor curve in the frontward area of host vehicle, the program proceeds as step S1→step S2→step S3→step S4→step S6→step S7→step S11→step S12 in the flowchart of FIG. 2. Thereby, the target deceleration α is maintained equal to 0.

Even if the driver has done the accelerator-off operation, it is unnecessary that the host vehicle is decelerated by activating the automatic brake, when a target object for speed reduction does not exist in the frontward area of the host vehicle. Further, the driver can anytime decelerate the host vehicle by depressing a brake pedal. Thus, an intervention by the automatic brake is limited to avoid unnecessary speed reductions, in the situation that the speed-reduction target object is absent. Moreover, the number (frequency) of actuations of an actuator (such as a valve or a pump in hydraulic circuit) for the automatic brake can be suppressed so that a durability can be improved.

Figure 17:
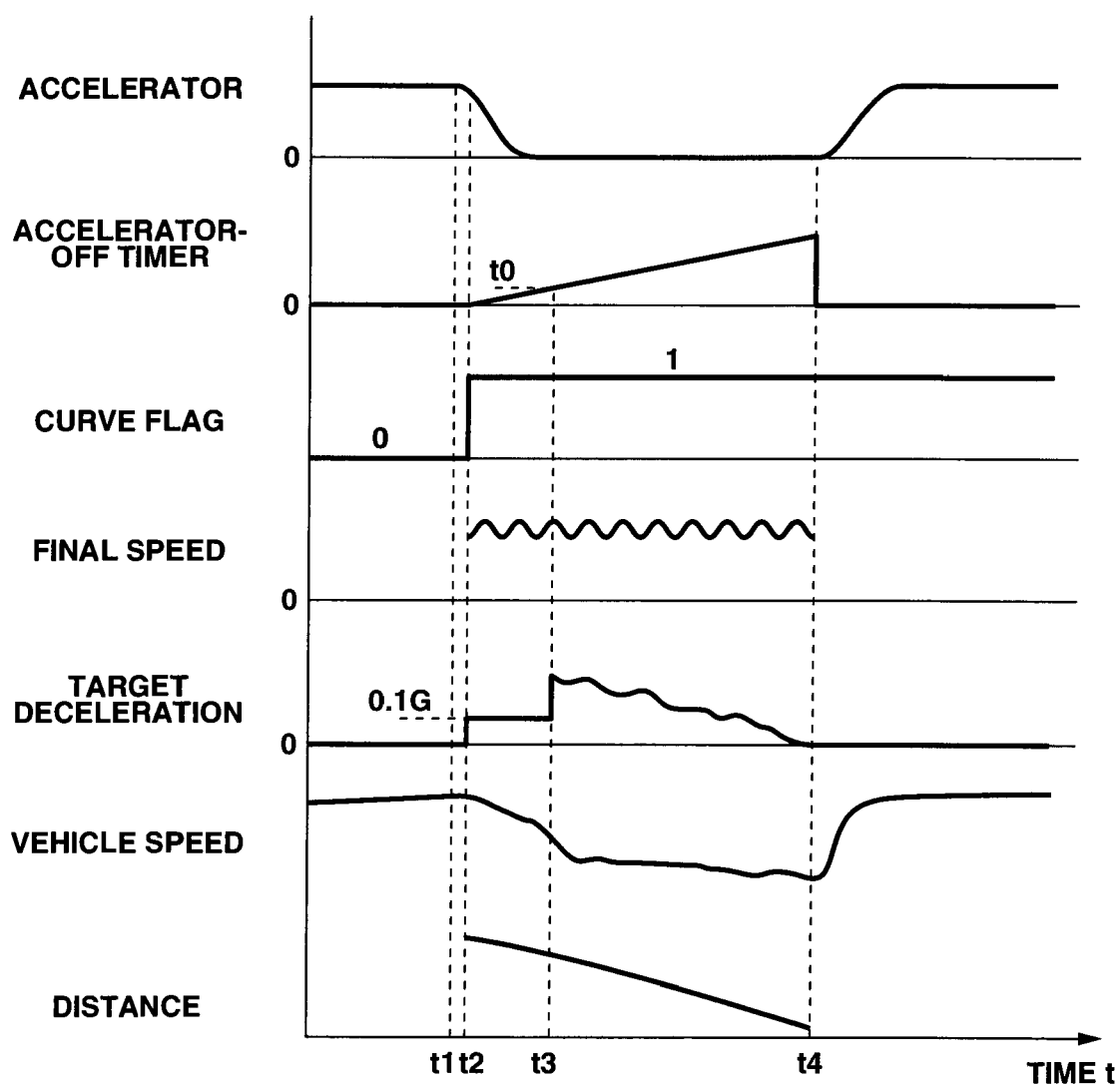
FIG. 17 is a time chart showing a variation of the target deceleration in the case that the host vehicle travels on a curve and also a preceding vehicle is absent.

FIG. 17 is a time chart showing a variation of the target deceleration in the case that the host vehicle travels on a curve and also a preceding vehicle is absent.

Since the accelerator opening is constant (>θ) until time point t1, the program proceeds as step S1→step S2→step S3→step S11→step S12 in the flowchart of FIG. 2. Until the time point t1, the target deceleration α is equal to 0. That is, even in the case where the host vehicle is traveling on a curve, the automatic brake is not activated (i.e., not applied) if the accelerator-off operation of the driver does not occur. Thus, the driver does not feel uncomfortable, because the reduction of speed of the host vehicle is not carried out if the driver has no intention of speed reduction. At the time point t1, the driver starts to release the accelerator.

At time point t2, the variation amount of the accelerator opening per unit time becomes smaller than the predetermined amount −δ. Hence, it is determined that the accelerator-off operation has occurred so that the program proceeds as step S1→step S2→step S3→step S4→step S6→step S7→step S8→step S9→step S10→step S12 in the flowchart of FIG. 2.

At this time, the accelerator-off timer starts to be incremented in the accelerator-opening judging logic of step S1; the curve flag (=1) is outputted in the curve judging logic of step S6; and the target deceleration α, which is necessary to reduce the initial speed (host vehicle speed Vs) to the final speed $V_E$ determined by the target turning speed, within the distance D given between the host vehicle and the intersection point of the lane edge and the (imaginary) running-directional center line of the host vehicle, is calculated in the deceleration determining logic of step S10. However, in the deceleration determining logic of step S10, the target deceleration α is set at the predetermined value (=0.1 G) because the value of accelerator-off timer is smaller than or equal to the predetermined time interval t0. Thereby, the automatic brake is activated so as to moderately decrease the speed of host vehicle.

A time interval between time point t2 and time point t3 varies in correspondence with the predetermined time interval t0 determined according to the accelerator releasing speed. The predetermined time interval t0 in the case where the accelerator releasing speed is high is made longer than that in the case where the accelerator releasing speed is low. That is, if the driver conducts the accelerator-off operation immediately before the curve, the target deceleration is maintained at 0.1 G for a relatively long time, resulting in a high turning speed. On the contrary, if the driver conducts the accelerator-off operation sufficiently before the curve, the target deceleration is maintained at 0.1 G for a relatively short time, resulting in a low turning speed. Therefore, the turning speed can be made high if the driver desires to turn at a high speed, and on the other hand, the turning speed can be made low if the driver desires to turn at a low speed. Accordingly, a turn behavior desired by the driver can be attained.

At time point t3, the value of accelerator-off timer becomes greater than the predetermined time interval t0. Hence, the automatic brake is actuated according to the target deceleration α calculated from the distance D, the initial speed Vs and the final speed $V_E$ in the deceleration determining logic of step S10. Therefore, the host vehicle can pass through the curve at a turning speed desired by the driver.

At time point t4, the driver starts to depress the accelerator. Hence, the accelerator-off timer is set at 0 in the accelerator-opening judging logic of step S1. Thereby, the program proceeds as step S1→step S2→step S11→step S12 in the flowchart of FIG. 2, so that the actuation of the automatic brake is terminated.

Figure 18:
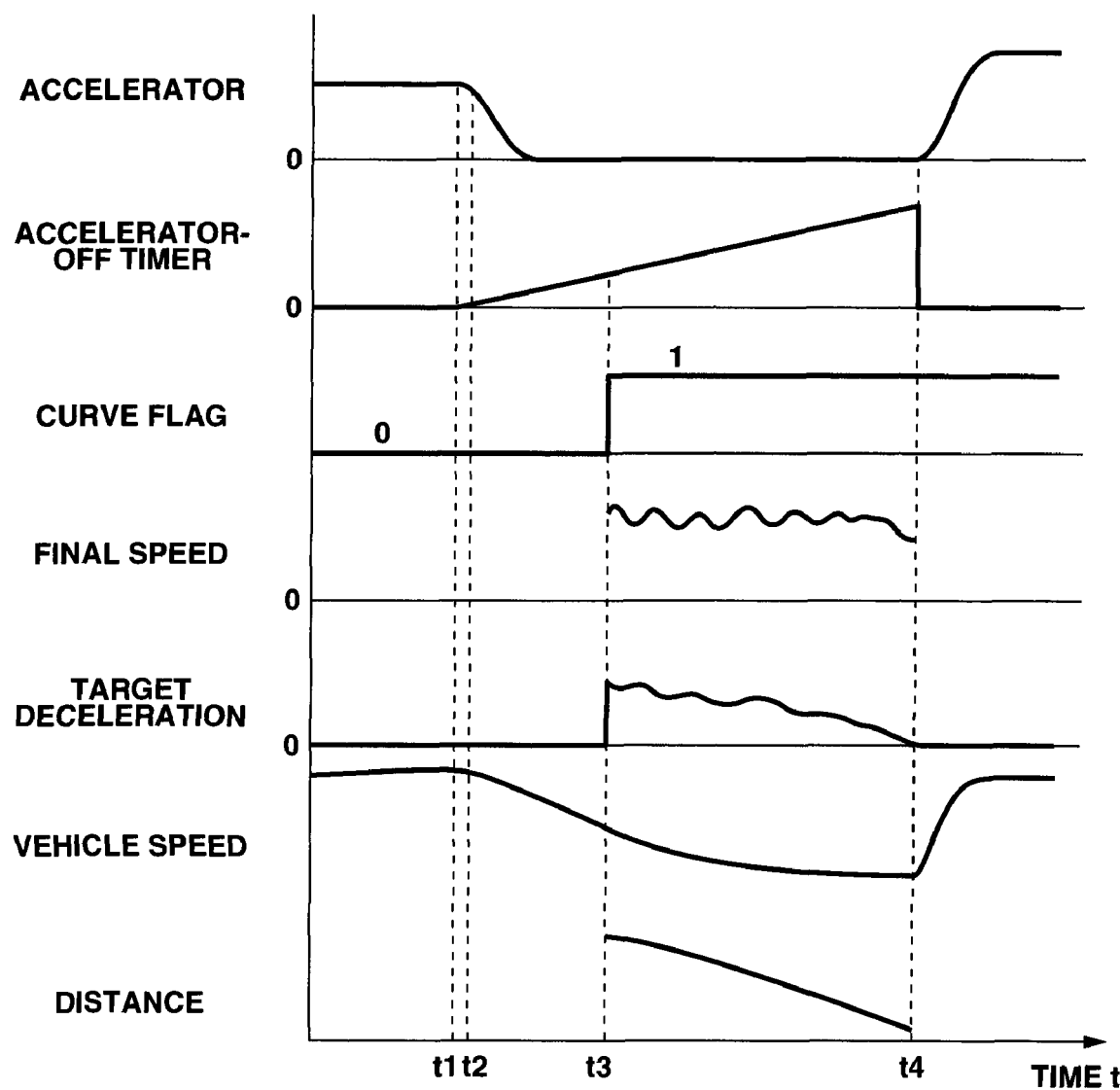
FIG. 18 is a time chart showing a variation of the target deceleration in the case that the host vehicle travels on a straight path anterior to a curve (a straight path soon leading into a curve) and also a preceding vehicle is absent.

FIG. 18 is a time chart showing a variation of the target deceleration in the case that the host vehicle travels on a straight path anterior to a curve (a straight path soon leading into a curve) and also a preceding vehicle is absent.

Since the accelerator opening is constant (>θ) until time point t1, the program proceeds as step S1→step S2→step S3→step S11→step S12 in the flowchart of FIG. 2. Until the time point t1, the target deceleration α is equal to 0. That is, even in the case where the host vehicle is traveling on a curve, the automatic brake is not activated (i.e., not actuated) if the accelerator-off operation of the driver does not occur. Thus, the driver does not feel uncomfortable, because the reduction of speed is not conducted if the driver has no intention of speed reduction. At time point t1, the driver starts to release the accelerator.

At time point t2, the variation amount of the accelerator opening per unit time becomes smaller than the predetermined amount −δ. Hence, it is determined that the accelerator-off operation has occurred so that the program proceeds as step S1→step S2→step S3→step S4→step S6→step S7→step S11→step S12 in the flowchart of FIG. 2.

That is, since the host vehicle is running along the straight path, the intersection point A between the lane edge and the running-directional center line of the host vehicle cannot be specified. Hence, the curve flag is set and outputted at 0 in the curve judging logic of step S6. Accordingly, the target deceleration α remains equal to 0 so as not to activate the automatic brake.

At the time point t3, the intersection point A can be specified in the curve judging logic of step S6. Hence, the program proceeds as step S1→step S2→step S3→step S4→step S6→step S7→step S8→step S9→step S10→step S12. Thereby, the automatic brake is actuated according to the target deceleration α which is calculated from the distance D to the intersection point A, the initial speed Vs and the final speed $V_E$ determined by the target turning speed, in the deceleration determining logic of step S10. Therefore, the host vehicle can pass through the curve at a turning speed corresponding to the driver's request.

At time point t4, the driver starts to depress the accelerator. Hence, the accelerator-off timer is set at 0 in the accelerator-opening judging logic of step S1. Thereby, the program proceeds as step S1→step S2→step S11→step S12, so that the actuation of the automatic brake is terminated.

Next, effects and advantages according to the first embodiment are now described.

In the technique disclosed in the above-mentioned Japanese Patent Application Publication No. H6-036187, the automatic brake is actuated based on only a vehicle speed for entry to a curve. Hence, a deviation is caused between a start timing of speed reduction in the automatic brake and a timing expected by the driver. Due to this, the driver feels uncomfortable.

On the contrary, in the first embodiment according to the present invention, the control unit 4 actuates the brake control section 5 in the case where the following two conditions are met. One is that the accelerator-state detecting section 2 detects the decrease of manipulated variable of the accelerator or the not-depressed state (off-state) of the accelerator, and another is that the traveling-path-condition detecting section 3 detects the target object for speed reduction on the traveling path.

The accelerator manipulation of the driver means a speed-increase intention or speed-reduction intention of the driver. Specifically, the accelerator-off operation of the driver means the speed-reduction intention of the driver. Therefore in the first embodiment, the automatic brake is activated (i.e., applied) in dependence on a timing of the accelerator-off operation, only in the case in which the driver has done the accelerator-off operation and also in which the target object for speed reduction exists on the traveling path ahead of the host vehicle. Thus, the speed-reduction start timing can be achieved in conformity with a braking intention of the driver.

Further, the control unit 4 actuates the brake control section 5 if the preceding-vehicle detecting section 7 and the curve detecting section 8 which correspond the speed-reduction target detecting section detect the preceding vehicle or curve, in the case where the accelerator-state detecting section 2 detects the accelerator-off operation. On the other hand, the control unit 4 does not actuate the brake control section 5 if the preceding-vehicle detecting section 7 and the curve detecting section 8 detect neither preceding vehicle nor curve, in the case where the accelerator-state detecting section 2 detects the accelerator-off operation.

That is, the automatic brake does not need to be applied if the target object for speed reduction does not exist ahead of the host vehicle even in the case where the driver has done the accelerator-off operation. Hence, in the first embodiment, the existence of the target object for speed reduction is set as a requirement (criterion) for actuating the automatic brake in addition to a requirement (criterion) of the accelerator-off operation. Thereby, an unnecessary speed-reduction of the host vehicle due to the intervention of the automatic brake can be avoided.

Further in the first embodiment, the preceding-vehicle determining logic and the curve judging logic are carried out after detecting the accelerator-off operation of the driver by the accelerator-opening judging logic. If the preceding vehicle or curve exists, the target deceleration value for the automatic brake control is set based on the detected preceding vehicle or the curve.

That is, the preceding-vehicle determining logic and the curve judging logic are not executed if there is no accelerator-off operation of the driver even in the case where the preceding vehicle or the curve exists ahead of the host vehicle. Accordingly, the number of executions of each of the preceding-vehicle determining logic and the curve judging logic can be suppressed to the minimum necessary, so that a load in calculation can be lightened.

The accelerator-state detecting section 2 is configured to determine or recognize the accelerator-off operation when the variation amount of accelerator opening per unit time is smaller than the predetermined amount $-\delta$. For example, in a technique in which the accelerator-off operation is determined only by using the condition that the accelerator opening is smaller than the value $\theta$ ($\approx 0$), a time interval from a time point when the driver starts to release the accelerator to a time point when the accelerator-off operation is determined is relatively long, in the case that the driver slowly releases the accelerator. Thus, the actuation timing of the automatic brake is retarded.

On the contrary, in the first embodiment, the accelerator-off operation is determined when the variation amount of accelerator opening per unit time is smaller than the predetermined amount $-\delta$. Accordingly, a releasing-start timing of the accelerator can be retarded. Even in the case that the releasing speed of the accelerator by the driver is slow, the start timing of speed reduction can be attained in accordance with the braking intention of the driver.

The traveling-path-condition detecting section 3 includes the preceding-vehicle detecting section 7 configured to detect whether the preceding vehicle is present or absent, and the curve detecting section 8 configured to detect whether or not the traveling path ahead of the host vehicle is a curve. The control unit 4 is configured to actuate the brake control section 5 on the basis of the condition of the preceding vehicle after the predetermined time interval has elapsed if the preceding-vehicle detecting section 7 detects the preceding vehicle. Moreover, the control unit 4 is configured to actuate the brake control section 5 on the basis of the curve after the predetermined time interval has elapsed, if the preceding-vehicle detecting section 7 detects no preceding vehicle and also the curve detecting section 8 detects the curve.

That is, the automatic brake is applied based on the state (condition) of the preceding vehicle by giving priority to the preceding vehicle if both of the curve and preceding vehicle exist ahead of the host vehicle. Accordingly, a safe distance to the preceding vehicle can be kept. Moreover, it can be considered that the preceding vehicle is already running in the curve, and hence, the preceding vehicle is running at a proper turning speed consistent with a shape of the curve. Therefore, the host vehicle can run at a proper turning speed consistent with the shape of the curve by actuating the automatic brake based on the state of the preceding vehicle.

The control unit 4 is configured to calculate the target deceleration $\alpha$ from the preceding-vehicle speed $V_E$ and the preceding-vehicle distance D and is configured to actuate the brake control section 5 to achieve this target deceleration $\alpha$, in the case of actuating the brake control section 5 on the basis of the condition of the preceding vehicle. Accordingly, the driver can properly maintain the distance D to the preceding vehicle, only by means of the accelerator-off operation.

On the other hand, the control unit 4 calculates the target curve entry speed as the final speed $V_E$ from the turning radius R of the curve and the set turning acceleration G, in the case of actuating the brake control section 5 on the basis of the curve. Then, the control unit 4 calculates the target deceleration $\alpha$ from the final speed $V_E$ and the distance D between the curve and the host vehicle, and actuates the brake control section 5 to achieve this target deceleration $\alpha$. Accordingly, the driver can achieve a turning of the host vehicle with a proper value of turning acceleration G, only by means of the accelerator-off operation.

In the first embodiment, the target deceleration $\alpha$ is limited by the limiter $\alpha$max. Since the target deceleration $\alpha$ is set based on the distance D, the initial speed Vs and the final speed $V_E$ in the first embodiment, there is a possibility that the target deceleration $\alpha$ becomes excessively large (in magnitude) so that the driver feels uncomfortable, in the case where the distance is very short or in the case where the initial speed Vs is much higher than the final speed $V_E$ (Vs$\gg V_E$). Hence, the target deceleration $\alpha$ is restricted by using the limiter $\alpha$max. Accordingly, uncomfortable feeling due to an excessive speed reduction can be prevented from occurring.

In the first embodiment, the turning acceleration G can be set at any value by the driver. Accordingly, the turning acceleration G can be varied according to the driver's preference so that a turn behavior consistent with a driving sense of the driver can be realized.

The accelerator-state detecting section 2 includes the accelerator releasing-speed detecting section 6 configured to detect the releasing speed of the accelerator (speed toward the off-state of accelerator opening). The turning acceleration G in the case where the releasing speed detected by the accelerator releasing-speed detecting section 6 is high is set as a value greater than that in the case where the releasing speed is relatively low. That is, it can be estimated that the driver desires a high-speed turning in the case where the releasing speed of the accelerator is high, because the driver has continued to depress the accelerator pedal until just before the curve in this case. On the contrary, it can be estimated that the driver desires a low-speed turning in the case where the releasing speed of the accelerator is low, because the driver has done the accelerator-off operation well before the curve in this case. Accordingly, by setting the turning acceleration G in the case of high releasing speed of the accelerator as a value greater than that in the case of low releasing speed, the turn behavior can be achieved as desired by the driver.

The control unit 4 is configured to actuate the brake control section 5 to achieve the predetermined deceleration (0.1 G) from the time point when the driver starts the accelerator-off operation to the time point when the predetermined time interval t0 has elapsed. Since the predetermined time interval t0 is set at a great value in the case where the releasing speed of the accelerator is high in the first embodiment, there is a possibility that the target deceleration α becomes excessively large which is set after the predetermined time interval t0. Hence in the first embodiment, by maintaining the target deceleration at the predetermined value 0.1 G from the start timing of accelerator-off operation until the lapse of predetermined time interval t0, the target deceleration α can be prevented from becoming excessively large (as compared with a case of not setting the predetermined value 0.1 G).

In the first embodiment, the accelerator opening sensor 11 is provided as the speed-up intention detecting section for detecting the speed-up intention of the driver. Thereby, the control section 4 is configured to limit the actuation of the brake control section 5 if the accelerator opening sensor 11 detects the speed-up (accelerating) intention of the driver. That is, by not actuating the automatic brake when the driver is depressing the accelerator, the host vehicle can be prevented from being decelerated contrary to the speed-up intention of the driver.

Moreover in the first embodiment, the control section 4 is configured to actuate the brake control section 5 so as to achieve the target deceleration α calculated from the distance D to the curve and the target turning speed at the curve, if the accelerator opening sensor 11 does not detect the speed-up intention of the driver. Accordingly, the host vehicle can be decelerated to a speed value enabling the host vehicle to stably travel in the curve, in the case that the driver does not have the speed-up intention.

Other Embodiments

Although the invention has been described above with reference to certain embodiments of the invention, the invention is not limited to the embodiments described above. Modifications and variations of the embodiments described above will occur to those skilled in the art in light of the above teachings.

For example, the target object for speed reduction is explained as the preceding vehicle and the curve in the first embodiment. However, the target object for speed reduction may include obstacles except the preceding vehicle, a traffic stop line or the like existing on the traveling path. Moreover, the automatic brake is applied by increasing fluid pressure of each wheel cylinder in the first embodiment. However, a regenerative brake may be used in the case of an electric vehicle equipped with a wheel-in motor.

The preceding-vehicle distance and preceding-vehicle speed are calculated after judging whether the preceding vehicle is present or absent, by using the stereo camera in the first embodiment. However, the presence/absence of the preceding vehicle and the calculation of the preceding-vehicle distance and speed may be performed by using a laser radar and a stereo camera or by using a laser radar and a yaw rate sensor or the like. In the first embodiment, it is determined that the accelerator-off operation has occurred, immediately after the driver has decreased the accelerator manipulated variable (accelerator opening). However, it may be determined that the accelerator-off operation has occurred, when a predetermined time interval has elapsed from a time point when the driver has decreased the accelerator manipulated variable (accelerator opening).

This application is based on prior Japanese Patent Application No. 2008-160240 filed on Jun. 19, 2008. The entire contents of this Japanese Patent Application are hereby incorporated by reference.

The scope of the invention is defined with reference to the following claims.

What is claimed is:

1. A vehicle control apparatus comprising:
   an accelerator-state detecting section configured to detect an accelerator manipulating state of a driver;
   a traveling-path-condition detecting section configured to detect a condition of a traveling path of a host vehicle;
   a brake control section configured to cause the host vehicle to automatically generate a braking force; and
   a control unit configured to control the brake control section on the basis of an input from the accelerator-state detecting section,
   the control unit being configured to actuate the brake control section in a case where the accelerator-state detecting section detects a decrease of a manipulated variable of the accelerator or an off-state of the accelerator and also where the traveling-path-condition detecting section detects a target object for speed reduction on the traveling path,
   wherein the control unit is configured to actuate the brake control section on the basis of the target object for speed reduction, when a predetermined time interval has elapsed from a time point when the driver starts to decrease the manipulated variable of the accelerator.

2. The vehicle control apparatus as claimed in claim 1, wherein
   the traveling-path-condition detecting section comprises:
      a preceding-vehicle detecting section configured to detect whether a preceding vehicle is present or absent, and
      a curve detecting section configured to detect whether or not the traveling path ahead of the host vehicle is a curve; and
   the control unit is configured to actuate the brake control section on the basis of a condition of the preceding vehicle if the preceding-vehicle detecting section detects the preceding vehicle, and is configured to actuate the brake control section on the basis of the curve if the preceding-vehicle detecting section detects no preceding vehicle and also the curve detecting section detects the curve.

3. The vehicle control apparatus as claimed in claim 2, wherein the control unit is configured:
   to calculate a target deceleration from a speed of the preceding vehicle and a distance between the host vehicle and the preceding vehicle, in the case of actuating the brake control section on the basis of the condition of the preceding vehicle, and to actuate the brake control section to achieve the target deceleration.

4. The vehicle control apparatus as claimed in claim 3, wherein the target deceleration is limited by an upper limit value.

5. The vehicle control apparatus as claimed in claim 2, wherein the control unit is configured to calculate a target curve entry speed from a radius of the curve and a set turning acceleration, in the case of actuating the brake control section on the basis of the curve.

6. The vehicle control apparatus as claimed in claim 5, wherein the control unit is configured:

to calculate a target deceleration from the target curve entry speed and a distance between the host vehicle and the curve, and to actuate the brake control section to achieve the target deceleration.

7. The vehicle control apparatus as claimed in claim 6, wherein the target deceleration is limited by an upper limit value.

8. The vehicle control apparatus as claimed in claim 5, wherein the turning acceleration can be set at any value by the driver.

9. The vehicle control apparatus as claimed in claim 5, wherein:

the accelerator-state detecting section comprises an accelerator releasing-speed detecting section configured to detect a releasing speed of the accelerator; and the turning acceleration is set as a function of the accelerator releasing speed detected by the accelerator releasing-speed detecting section.

10. The vehicle control apparatus as claimed in claim 1, wherein the control unit is configured to actuate the brake control section so as to achieve a predetermined deceleration, from the time point when the driver starts to decrease the manipulated variable of the accelerator to the time point when the predetermined time interval has elapsed.

11. A vehicle control apparatus comprising:

an accelerator-state detecting section configured to detect an accelerator manipulating state of a driver;

a speed-reduction target detecting section configured to detect whether a target object for speed reduction is present or absent in a traveling direction of the host vehicle;

a brake control section configured to cause the host vehicle to automatically generate a braking force; and a control unit configured to control the brake control section on the basis of an input from the accelerator-state detecting section, the control unit being configured:

to actuate the brake control section if the speed-reduction target detecting section detects the target object for speed reduction, in a case where the accelerator-state detecting section detects a decrease of a manipulated variable of the accelerator or an off-state of the accelerator, and not to actuate the brake control section if the speed-reduction target detecting section detects no target object for speed reduction, in the case where the accelerator-state detecting section detects the decrease of the manipulated variable of the accelerator or the off-state of the accelerator, wherein the control unit is configured to actuate the brake control section on the basis of the target object for speed reduction, when a predetermined time interval has elapsed from a time point when the driver starts to decrease the manipulated variable of the accelerator.

12. A vehicle control apparatus comprising:

an accelerator-state detecting section configured to detect an accelerator manipulating state of a driver;

a speed-reduction target detecting section configured to detect whether a target object for speed reduction is present or absent in a traveling direction of the host vehicle;

a brake control section configured to cause the host vehicle to automatically generate a braking force; and a control unit configured to control the brake control section on the basis of an input from the accelerator-state detecting section, the control unit being configured:

to actuate the brake control section if the speed-reduction target detecting section detects the target object for speed reduction, in a case where the accelerator-state detecting section detects a decrease of a manipulated variable of the accelerator, and not to actuate the brake control section if the speed-reduction target detecting section detects no target object for speed reduction, in the case where the accelerator-state detecting section detects the decrease of the manipulated variable of the accelerator or an off-state of the accelerator, wherein the control unit is configured to actuate the brake control section to achieve a predetermined deceleration, from a time point when the manipulated variable of the accelerator starts to be decreased to a time point when a predetermined time interval has elapsed.

13. The vehicle control apparatus as claimed in claim 12, wherein the speed-reduction target detecting section comprises:

a preceding-vehicle detecting section configured to detect whether a preceding vehicle is present or absent, and a curve detecting section configured to detect whether or not a traveling path ahead of the host vehicle is a curve; and wherein the control unit is configured:

to actuate the brake control section on the basis of a condition of the preceding vehicle after the predetermined time interval has elapsed, if the preceding-vehicle detecting section detects the preceding vehicle, and to actuate the brake control section on the basis of the curve after the predetermined time interval has elapsed, if the preceding-vehicle detecting section detects no preceding vehicle and also the curve detecting section detects the curve.

14. The vehicle control apparatus as claimed in claim 13, wherein the control unit is configured to calculate a target deceleration from a speed of the preceding vehicle and a distance between the host vehicle and the preceding vehicle and configured to actuate the brake control section to achieve the target deceleration, in the case of actuating the brake control section on the basis of the condition of the preceding vehicle; and wherein the control unit is configured to calculate the target deceleration based on a distance between the curve and the host vehicle and based on a target curve entry speed calculated from a radius of the curve and a set turning acceleration and configured to actuate the brake control section to achieve the target deceleration, in the case of actuating the brake control section on the basis of the curve.

15. The vehicle control apparatus as claimed in claim 14, wherein the target deceleration is limited by an upper limit value.

16. The vehicle control apparatus as claimed in claim 14, wherein the turning acceleration can be set at any value by the driver.

* * * * *